US008588986B2

(12) United States Patent  
Rudkevich et al.

(10) Patent No.: US 8,588,986 B2
(45) Date of Patent: Nov. 19, 2013

(54) POWER TRANSMISSION SWITCHING

(75) Inventors: Aleksandr Rudkevich, Newton, MA (US); Pablo Ruiz, Cambridge, MA (US)

(73) Assignee: CRA International, Inc., Boston, MA (US)

( * ) Notice: Subject to any disclaimer, the term of this patent is extended or adjusted under 35 U.S.C. 154(b) by 0 days.

(21) Appl. No.: 13/405,022

(22) Filed: Feb. 24, 2012

(65) Prior Publication Data

US 2013/0226358 A1 Aug. 29, 2013

(51) Int. Cl.
G05D 3/12 (2006.01)
G05D 5/00 (2006.01)
G05D 9/00 (2006.01)
G05D 11/00 (2006.01)
G05D 17/00 (2006.01)

(52) U.S. Cl.
USPC ........... 700/286; 700/291; 700/292; 700/295; 700/296

(58) Field of Classification Search
USPC .......................... 700/286, 291, 292, 295, 296
See application file for complete search history.

(56) References Cited

U.S. PATENT DOCUMENTS

| | | | | |
|---|---|---|---|---|
| 4,689,752 | A * | 8/1987 | Fernandes et al. | 700/292 |
| 6,571,152 | B1 * | 5/2003 | Sawa et al. | 700/286 |
| 7,117,070 | B2 * | 10/2006 | Chow et al. | 700/297 |
| 7,359,878 | B2 | 4/2008 | Peljto et al. | |
| 7,660,649 | B1 * | 2/2010 | Hope et al. | 700/295 |
| 7,949,435 | B2 * | 5/2011 | Pollack et al. | 700/291 |
| 8,239,070 | B1 * | 8/2012 | Schlueter et al. | 700/286 |
| 8,359,124 | B2 * | 1/2013 | Zhou et al. | 700/291 |
| 8,401,709 | B2 * | 3/2013 | Cherian et al. | 700/291 |
| 2003/0225481 | A1 * | 12/2003 | Sealing et al. | 700/286 |
| 2007/0055889 | A1 | 3/2007 | Henneberry et al. | |
| 2008/0077368 | A1 | 3/2008 | Nasle | |
| 2009/0206059 | A1 * | 8/2009 | Kiko | 218/143 |
| 2009/0212965 | A1 | 8/2009 | Becattini et al. | |
| 2010/0094477 | A1 | 4/2010 | Berggren et al. | |
| 2011/0016063 | A1 * | 1/2011 | Pollack et al. | 705/412 |
| 2011/0106327 | A1 * | 5/2011 | Zhou et al. | 700/291 |
| 2012/0316688 | A1 * | 12/2012 | Boardman et al. | 700/291 |
| 2012/0316691 | A1 * | 12/2012 | Boardman et al. | 700/293 |
| 2013/0073098 | A1 * | 3/2013 | Gan et al. | 700/286 |

OTHER PUBLICATIONS

International Search Report and Written Opinion for International Application No. PCT/US13/27488 mailed May 9, 2013. 14 pages.
Fuller, J. David. "A Fast Heuristic for Optimal Transmission Switching." Informs Meeting. Austin, Texas, Nov. 9, 2010. 13 pages.
Gabriel et al. Session Detail Information. Cluster: Energy, Natural Resources and the Environment/Energy. Nov. 2010. 1 page.

* cited by examiner

*Primary Examiner* — Ronald Hartman, Jr.
(74) *Attorney, Agent, or Firm* — Wilmer Cutler Pickering Hale and Dorr LLP

(57) ABSTRACT

A method for transmission network control, the transmission network being configured for use in providing electricity from a generator to an end user, the method including receiving a sensitivity parameter, identifying a switchable set of switches within the transmission network using the sensitivity parameter, determining a candidate switch from the switchable set to change a corresponding state, wherein the state can be changed from open to closed and closed to open, determining a proposed change of state of the candidate switch, updating an optimal power flow (OPF) problem as a function of the candidate switch and the proposed change of state, determining and storing in a memory a solution to the updated OPF problem, generating an updated sensitivity parameter based on the stored solution to the updated OPF problem, and determining, using the updated sensitivity parameter, if the stored solution to the updated OPF problem meets a predetermined criterion.

20 Claims, 5 Drawing Sheets

POWER TRANSMISSION SWITCHING

BACKGROUND

Typically, power generation plants provide electricity to end-users via an electrical distribution network. Power generated by a power plant is provided to a transmission network, which provides electricity to a distribution network, which provides electricity to end-users. Different companies may own different parts of an electrical distribution network, and different portions of electrical network may have different costs associated it. For example, the cost to generate electricity at one power generation plant can vary when compared with the next. Also, the cost to transmit a given amount of electricity over one portion of the transmission network can differ from the cost to transmit the same amount of electricity over a different portion of the transmission network.

One method to control the generation and distribution of electricity is called economic dispatch. Economic dispatch typically involves the short-term determination of the optimal output of a number of electricity generation facilities, to meet the system load, at the lowest possible cost, while providing power in a robust and reliable manner. Economic dispatch systems typically use specialized computer software that is configured to honor operational and system constraints of the available resources and corresponding transmission capabilities.

SUMMARY

In general, in an aspect, embodiments of the invention may provide a computerized method for transmission network control, the transmission network including transmission lines and corresponding switches, the transmission network being configured for use in providing electricity from a generator to an end user, the method including receiving and storing a sensitivity parameter, identifying a switchable set of switches within the transmission network using the sensitivity parameter, determining a candidate switch from the switchable set to change a corresponding state, wherein the state can be changed from open to closed and closed to open, determining a proposed change of state of the candidate switch, updating an optimal power flow (OPF) problem stored in a memory as a function of the candidate switch and the proposed change of state, determining and storing in a memory a solution to the updated OPF problem, generating an updated sensitivity parameter based on the stored solution to the updated OPF problem, and determining, using the updated sensitivity parameter, if the stored solution to the updated OPF problem meets a predetermined criterion.

Implementations of the invention may include one or more of the following features. The method includes determining if the solution to the updated OPF problem is feasible. The method further includes reverting to a prior OPF solution if the solution to the updated OPF problem is not feasible. The method includes determining if the solution to the updated OPF problem results in a performance improvement of the transmission network from a prior OPF solution. The method includes determining if an operating cost of the transmission network changes. The method further includes iteratively performing each of the steps until a stopping criterion is satisfied. The sensitivity parameter includes one of a physical sensitivity parameter, economic sensitivity parameter, and an environmental sensitivity parameter. The method includes generating the updated sensitivity parameter based on at least one of a locational price and a shadow price of a transmission constraint. The predetermined criterion is a function of whether the solution to the updated OPF problem i) is feasible, and ii) will result in a performance improvement of the transmission network, and the method further comprises implementing the solution to the updated OPF problem if the predetermined criterion is satisfied.

Implementations of the invention may also provide one or more of the following features. The method includes identifying which transmission line within the transmission network is the least profitable. The method includes determining price differences between end nodes of a plurality of transmission lines in the transmission network, and identifying which of the price differences is largest. The method includes, determining absolute values of price differences between end nodes of a plurality of transmission lines in the transmission network, and identifying which of the absolute values is largest. The method includes determining cost derivatives associated with a plurality of transmission lines in the transmission network, and identifying the cost derivative having the most negative cost impact. The method includes determining power transfer distribution factors associated with a plurality of transmission lines in the transmission network, and identifying the power transfer distribution factor having the most negative value.

In general, in another aspect, embodiments of the invention may provide a tangible computer readable medium including instructions that, when executed by the a computer, cause the computer to receive a sensitivity parameter, identify a switchable set of switches associated with transmission lines in a transmission network using the sensitivity parameter, determine a candidate switch from the switchable set to change a corresponding state, wherein the state can be changed from open to closed and closed to open, determine a proposed change of state of the candidate switch, update an optimal power flow (OPF) problem as a function of the candidate switch and the proposed change of state, determine a solution to the updated OPF problem, generate an updated sensitivity parameter based on the solution to the updated OPF problem, and determine, using the updated sensitivity parameter, if the solution to the updated OPF problem meets a predetermined criterion.

Implementations of the invention may provide one or more of the following features. The instructions are further configured to cause the computer to identify which transmission line within the transmission network is the least profitable. The instructions are further configured to cause the computer to determine price differences between end nodes of a plurality of transmission lines in the transmission network, and identify which of the prices differences is largest. The instructions are further configured to cause the computer to determine absolute values of price differences between end nodes of a plurality of transmission lines in the transmission network, and identify which of the absolute values is largest. The instructions are further configured to cause the computer to determine cost derivatives associated with a plurality of transmission lines in the transmission network, and identify the cost derivative having the most negative cost impact. The instructions are further configured to cause the computer to determine power transfer distribution factors associated with a plurality of transmission lines in the transmission network, and identify the power transfer distribution factor having the most negative value.

In general, in still another aspect, embodiments of the invention may provide a system for performing economic dispatch in connection with a transmission network, the system including a processor, a tangible computer readable medium coupled to the processor, the tangible computer readable medium including instructions that, when executed by the processor, cause the processor to manage the transmission network using sensitivity parameters, wherein the processor is configured to cause individual switches in the transmission network to open and close as a function of the sensitivity parameters.

Various aspects of the invention may provide one or more of the following capabilities. The transmission of electricity from a generation plant to an end user can be optimized to lower the impacts of transmission congestion. The generation of electricity by generation plants can be optimized to match a predicted future demand. Profit associated with generating and distributing electricity can be increased. Transmission lines to open and close, in order to optimize the transmission of electricity, can be identified. The cost to generate to supply electricity to end-users can be reduced. Sensitivity parameters can be used for economic dispatch and transmission network control.

These and other capabilities of the invention, along with the invention itself, will be more fully understood after a review of the following figures, detailed description, and claims.

DETAILED DESCRIPTION

Embodiments of the invention provide techniques for controlling the configuration of a physical electrical system using an economic dispatch process that considers sensitivity parameters. A transmission topology system included in a conventional economic dispatch system receives sensitivity parameters relating to the transmission network and generates an optimal configuration of the transmission network to, for example, reduce the overall cost associated with providing electricity. The transmission topology system iteratively performs a process that identifies candidate switches to open or close, in order to determine an optimal solution. Once a candidate solution is identified, the candidate solution is checked to ensure i) that it will actually result in a more-optimized configuration than the current configuration, and ii) that it can actually be implemented by the transmission network. Other embodiments are within the scope of the invention.

Figure 1:
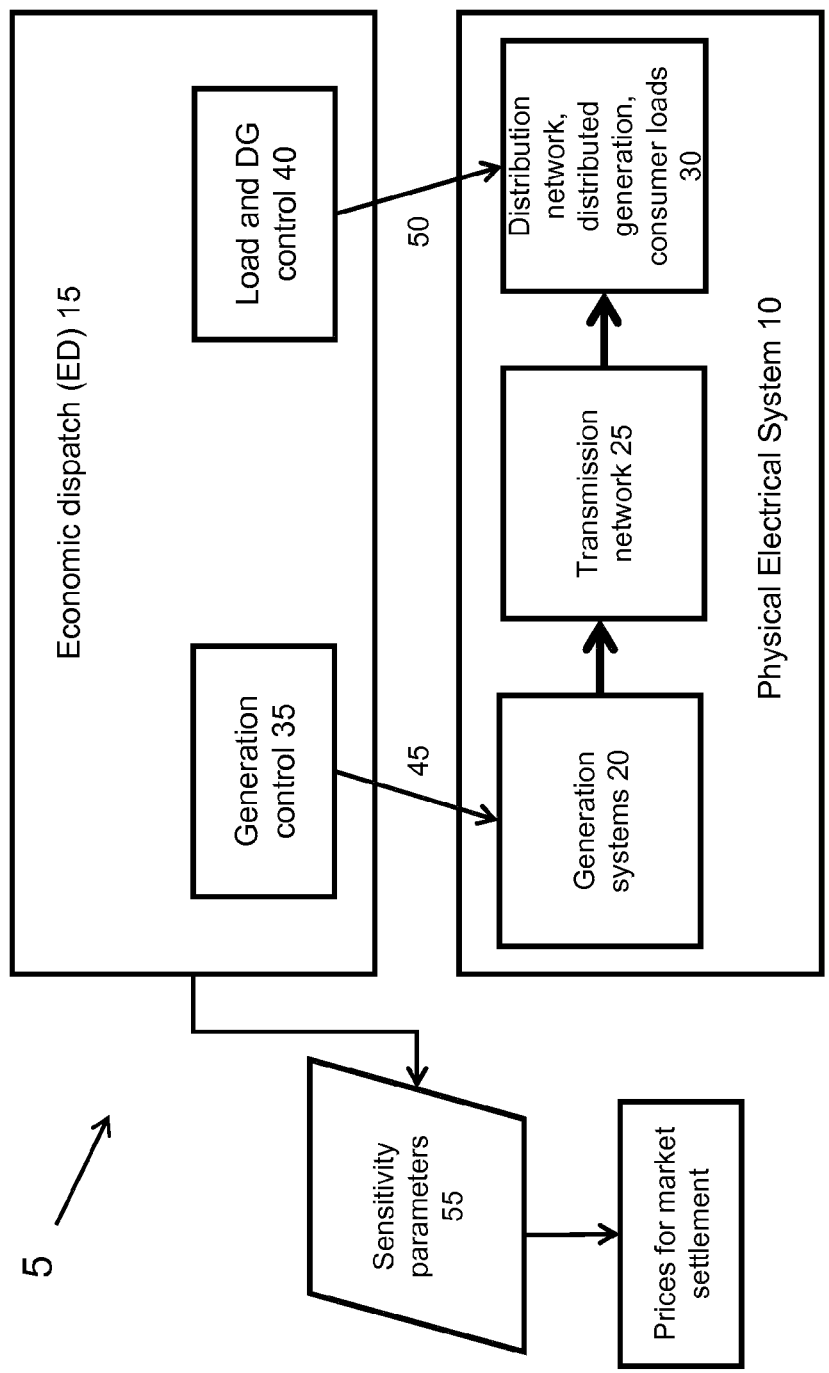
FIG. 1 is a block diagram of an electrical distribution system.

Referring to FIG. 1, a prior art conventional electrical distribution system 5 includes a physical electrical system 10 and an economic dispatch system 15. The electrical distribution system 5 is configured to generate electricity that is ultimately provided to end-users such as homes and businesses. The electrical distribution system 5 can be owned or operated by one or more companies, and can be connected to other electrical distribution systems operated by other companies as well.

The physical electrical system 10 may include generation system 20, a transmission network 25, and a distribution network 30.

The generation system 20 represents the generation service provided by the physical electrical system 10. The generation system 20 typically includes interconnected generating units, power storage devices, generator controlling equipment, and other facilities enabling the injection of power produced by generating units into the transmission network 25. The power generating units can be, for example, nuclear powered, coal powered, wind powered, solar powered, and natural gas powered.

The transmission network 25 may represent high-voltage transmission service. For example, the transmission network 25 can include long haul and/or short haul transmission lines that are typically operated at high voltage. The transmission network 25 may include high voltage transmission facilities such as step-up transformers, switches, switchyards, transmission lines, transformers, power storage devices, switches, interconnection buses, capacitors, shunts, phase angle regulators, AC-DC and DC-AC converters, FACTS devices (e.g., a flexible AC transmission system that employs power electronics principles to control, in real time, the properties of the transmission system where they are located), metering devices, step-down transformers, and other equipment used for delivery of high-voltage electric power from generation plants to distribution networks serving ultimate end users. The transmission network 25 typically operates at a higher voltage than the distribution network 30 (e.g., the transmission network 25 typically operates at nominal voltages above 60,000 V, such as 69,000 V, although other voltages are possible). The configuration of the transmission network 25 can be controlled by, for example, opening and closing switches thereby coupling or decoupling different portions of the network.

Figure 5:
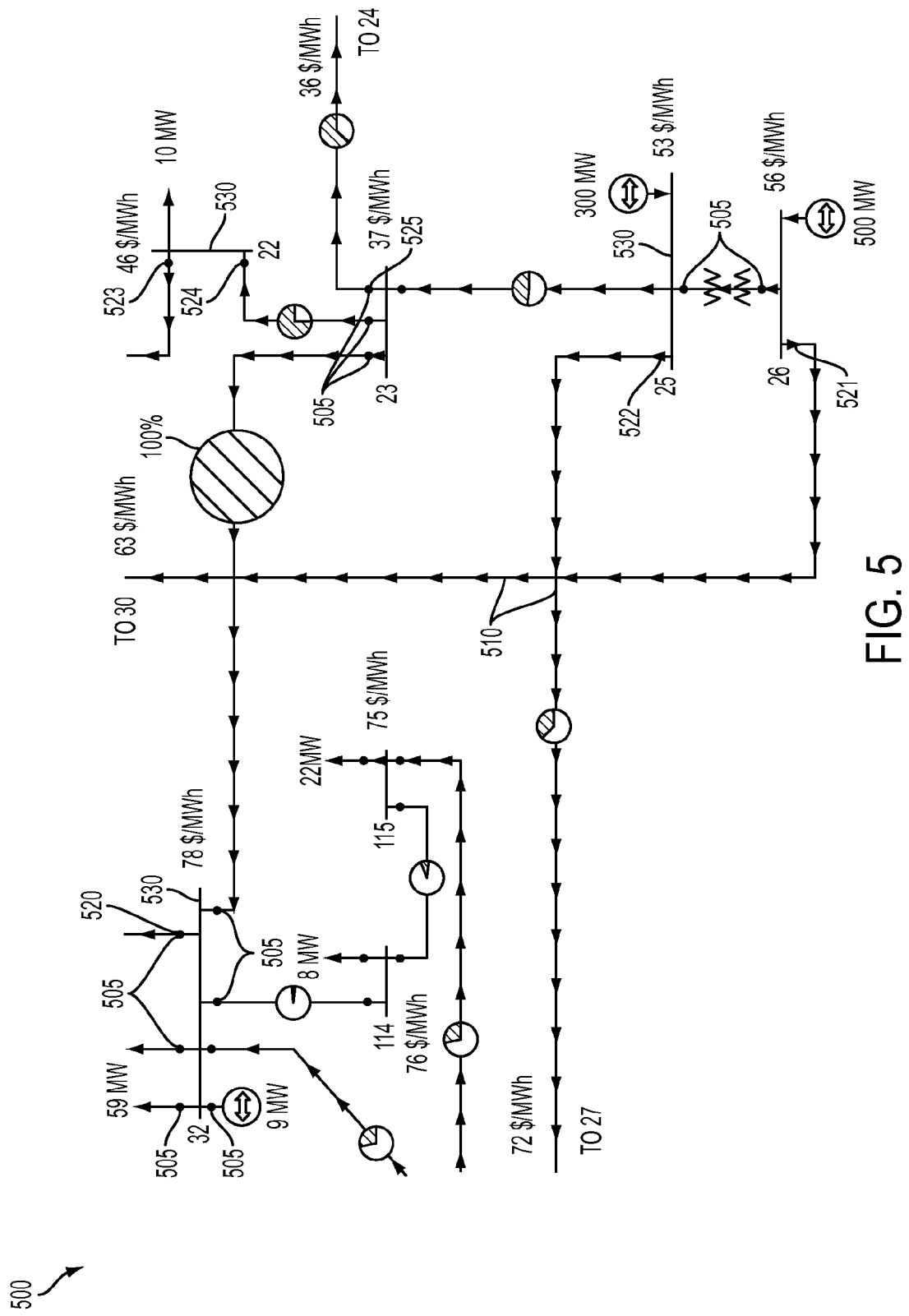
FIG. 5 is an exemplary portion of a transmission network.

Referring to FIG. 5, transmission network 500 is shown, and may be a portion of a larger transmission network. Transmission network 500 may include switches 505, transmission lines 510, and transmission nodes 530, among other things. As can be seen from FIG. 5, each of the transmission nodes 530 can have a corresponding cost (e.g., $/MWh) associated with it.

The distribution network 30 includes a network of distributions lines that are configured to provide electricity from the transmission network 25 to ultimate end-users. This network typically includes distribution lines, metering devices, switches, controllers, power storage devices, distributed generators, as well as end user equipment and appliances either controllable by a system operator (e.g., load control) or non-controllable by a system operator, ultimately consuming electric energy generated and delivered. The distribution network 30 typically operates at lower voltages than the transmission network 25 (e.g., on the order of hundreds or thousands of volts).

The distribution network 30 can also include one or more distributed generation nodes. The distributed generation nodes can include generators that are operated by end users and that are connected to the distribution network 30. For example, individual end-users may operate solar panels and/or wind turbines that can inject electricity back into the distribution network 30. The distributed generation nodes can be controlled by the economic dispatch system 15, as will be described more fully below.

The economic dispatch system 15 includes a generation control system 35 and a load and distributed generation control system 40. The generation control system 35 and the load and distributed generation control system 40 are coupled to the generation system 20 and the distribution network 30 via connections 45 and 50, respectively. The connections 45 and 50 can be, for example, a network connection. The economic dispatch system 15 is configured to control the overall operation of the electrical system 5. For example, the economic dispatch system 15 can be configured to control the generation and distribution of electricity across physical electrical system 10 as described more fully below.

The generation control system 35 is configured to control the generation system 20. For example, the generation control system 35 can, based on the estimated future demand within the physical electrical system 10, cause individual generators to adjust production, cause energy storage devices to inject electricity into the transmission network 25, and cause energy storage devices to withdraw electricity and store energy.

The load and distributed generation control system 40 is configured to control the operation of the distribution network 30. For example, the load and distributed generation control system 40 can cause individual distributed generation systems to inject power into the distribution network, cause demand at given end-users to decrease, and can cause the distribution network to change how electricity is distributed across the distribution network.

Economic dispatch can be performed based on a forecast of the future state of the physical electrical system 10. The system operator can forecast and/or model the future state of the physical electrical system 10 including, for example, the demand for electricity, the available supply of electricity, and the likelihood of faults in the electrical system. By forecasting the future state of the physical electrical system 10, economic dispatch processing can generate forward operational instructions for generation, storage, and load control. For example, the system operator can have the ability to control power injections of generators (including distributed generators), control injections and withdrawals by energy storage devices, and control power usage on certain groups of consumer equipment and appliances representing load control resources. The economic dispatch system 15 can be configured to control the generation control system 35, and the load and distributed generation control system 40 via connections 45 and 55, respectively. Some examples of economic dispatch tools are POWERWORLD SIMULATOR, produced by PowerWorld Corporation of Champaign, Ill., GE MAPS, produced by General Electric, of Fairfield, Conn., and ABB GRIDVIEW, produced by ABB Ltd. of Zurich, Switzerland.

The forecasting and/or modeling can be performed for any future time period, but is typically performed from several minutes to several hours ahead of operation. Using economic dispatch, a system operator can monitor and predict how much electricity to generate, and can, for example, schedule one or more of the generation plants 20 (or distributed generation nodes) to turn on or off. Additionally, using economic dispatch, an operator can instruct individual end-users to reduce their power demand during peak times (e.g., instructing an aluminum smelting plant to shut down during a time of peak demand).

One example of how economic dispatch can work, is an example where the electrical systems of Minnesota, Wisconsin, and Michigan are controlled by the same economic dispatch system 15. The economic dispatch system 15 that oversees the tri-state electrical grid can be configured to predict if, for example, Chicago will need an increased amount of electricity within the near future. If so, the economic dispatch system 15 can determine the most efficient manner of providing the needed electricity to Chicago given the resources managed by the economic dispatch system 15. For example, generators near Chicago may have the ability to ramp up and provide more electricity to Chicago, but it may be cheaper to generate more electricity in Minnesota and sell the electricity to Chicago.

Economic dispatch can be performed using specialized power system optimization software tools to optimize the operation of the electrical distribution system 5. For example, the economic dispatch process can be used to satisfy consumer loads while lowering the cost of generation, storage, and load control resources. Additionally, the economic dispatch process can also be used to ensure that the optimization process occurs subject to availability, operational constraints, and security constraints of the electrical distribution system 5. For example, limitations on the operation of electrical distribution system 5 can include thermal limitations, voltage limitations, and stability limitations of individual transmission facilities and/or groups of such facilities. Typically, economic dispatch software tools rely on a linear programming optimization algorithm also known as DC linearized Optimal Power Flow (OPF) algorithm, which relies on linear programming (LP) optimization algorithms.

In addition to operational control discussed above, the economic dispatch system 15 can also generate a set of physical and/or economic sensitivity parameters 55 that can be used to calculate electricity prices used for the purpose of market settlement. At a high level, sensitivity parameters are parameters that can describe the overall operation of the physical electrical system 10, such as parameters that relate to the overall supply and demand within the physical electrical system 10, and parameters that relate to operational characteristics of parts of the physical electrical system 10. Sensitivity parameters can be obtained based on the output of optimization algorithms such as LP algorithms.

As an example of one sensitivity parameter, assume that the physical electrical system 10 is operating in an optimal state, and the demand for power increases at a given location. Because of the increased demand at the given location, the physical electrical system 10 should be re-optimized for lowest-cost operation. After re-optimizing the physical electrical system, there may be an increase or decrease in the total system cost. The increase or decrease can be a sensitivity parameter. For example, this may be considered a locational price of administration.

As a second example of a sensitivity parameter, assume that a given transmission line has a predetermined capacity (e.g., 100 MW), and the system operator would like to increase its transfer capability (e.g., to 101 MW). The change in the capacity of the transmission line will likely have an effect on the overall operational cost of the physical electrical system 10. The difference in the overall cost can be another sensitivity parameter.

As yet another example of a sensitivity parameter, assume that there are multiple nodes within the physical electrical system 10 where power can be injected and/or withdrawn. If a system operator wishes to change the operation of the physical electrical system 10 by injecting additional power at one node, while withdrawing the same amount from another node, this may affect the overall operation of the physical electrical system 10. The overall power flow through the physical electrical system 10 can change, overall operational cost of the physical electrical system 10 can change, and power may have to be redistributed across the physical electrical system 10 to compensate for the change. All of these differences can be sensitivity parameters.

Still other examples of sensitivity parameters 55 can include: the incremental cost increase or decrease with a system topology change, and the incremental flow increase or decrease on a transmission facility with a system topology change.

Figure 2:
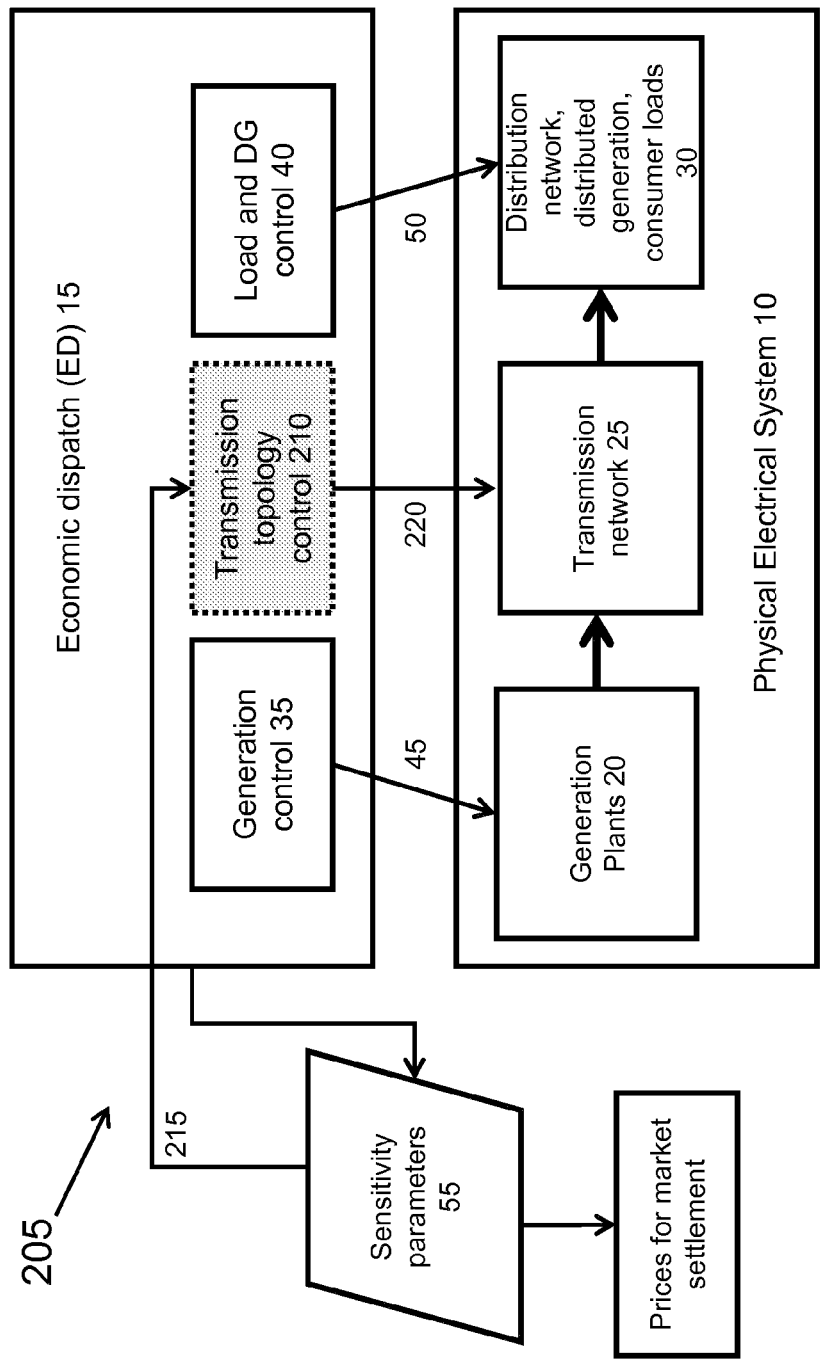
FIG. 2 is a block diagram of an electrical distribution system including transmission topology control.

Referring to FIG. 2, an electrical distribution system 205 is shown. The electrical distribution system 205 is configured to generate electricity that is ultimately provided to end-users such as homes and businesses using economic dispatch. The electrical distribution system 205 includes many of the same components as the electrical distribution system 5, and includes all of the same functionality as that described with respect to the electrical distribution system 5. To the extent that components of the electrical system 205 are identified by same reference numbers used in FIG. 1, these components are equivalent.

In addition to the components described above with respect to the electrical distribution system 5, the electrical distribution system 205 further includes a transmission topology control 210 that is configured to receive sensitivity parameters 215 and to provide transmission control instructions 220 to the transmission network 25. The operation of the transmission topology control 210 will be described further with respect to FIGS. 3 and 4 below. While the sensitivity parameters 55 are shown as being provided from outside the economic dispatch system 15, this is not required. Sensitivity parameters 55 may originate from within the economic dispatch system 15 and the physical electrical system 10.

The transmission topology control 210 is configured to control the transmission network 25 via connection 220. For example, the transmission topology control 210 can be configured to control the configuration of the transmission network 25 by causing switches (e.g., switches 510 in FIG. 5) within the transmission network 25 to open or close. Typically, the control of the transmission network 25 is direct (e.g., the transmission topology control 210 causes individual switches to open or close). The direct control of the transmission network 25 can also indirectly control the operations of the generation system 20 and the distribution network 30. For example, by opening a set of switches associated with a specific transmission line, this may cause one or more generation plants to ramp up or ramp down. Indirect control of the generation plants 20 and the distribution network 30 is not required, and can be direct.

The transmission topology control 210 is configured to use incoming sensitivity parameters 215 to calculate an optimized configuration of the physical electrical system 10. The transmission topology control 210 is configured to calculate the optimized configuration using a recursive method, as will be described in more detail below. At a high level, the transmission topology control 210 uses the sensitivity parameters 215 to calculate a topology of the physical electrical system 10. The calculated topology is checked to determine if i) it is a more optimal configuration than the existing configuration, ii) if the calculated topology is possible given the configuration of the physical electrical system 10, and iii) if a more optimal configuration is possible. The transmission topology control 210 preferably includes an iteration counter to track the number of iterations the transmission topology control 210 performs. This process will be described in more detail below.

The transmission topology control 210 is configured to use an algorithm that relies on a set of heuristic criteria based on the global marginal cost of congestion, which is routinely estimated by the existing OPF solution. The algorithm can determine topology improvements by iteratively solving the LP formulation of the lossless OPF, thus achieving economic efficiency with minimal computational effort. The algorithm can sequentially determine an OPF solution and, given the OPF results, select a set of candidate switches to change status (e.g., open or close). The selection of the candidate switches to open/close is based on sensitivity analysis of the congestion costs with respect to changes in the switches connectivity. Should an OPF solution indicate an infeasible state (e.g., a state that is impossible to implement using the physical electrical system 10), the state can be reverted to a previous state.

While the foregoing discussion focuses on how the transmission topology control 210 uses the sensitivity parameters 215 to control the operation of the physical electrical system 10, the generation control system 35 and the load and distributed generation system 40 can also use the sensitivity parameters 215 to control the operation of the physical electrical system 10. That is, using a recursive method similar to that described below in FIGS. 3-4, the generation control system 35 and the load and distributed generation control system 40 can use sensitivity parameters to control the generator in a similar manner as the transmission topology control 210. For example, the generation control system 40, instead of selecting switches to change state, could select candidate power storage devices to withdraw or inject power.

Figure 3:
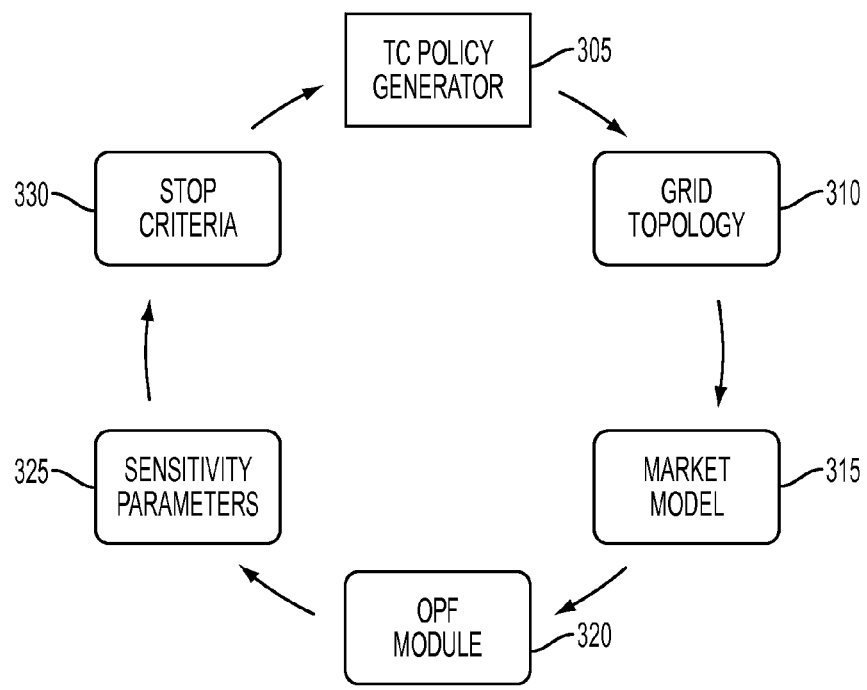
FIG. 3 is a functional diagram of a system used to control transmission of electricity.

Referring to FIG. 3, an exemplary functional diagram of the topology control 210 is shown. Additional details about the functionality provided by each of the modules shown in FIG. 3 is also provided below with respect to FIG. 4.

Module 305 relates to a transmission control policy generator. This module can define the algorithms that identify possible changes to the topology of the transmission network 25 that will likely result in the reduction of transmission congestion or reduction in system-wide generation costs. For example, this module can identify a set of potential switches to open or close within the transmission network 25 in order to reduce congestion or reduce operating costs. Typically, the set of potential switches to open or close is less than all of the switches contained in the transmission network 25.

Module 310 relates to the grid topology. This module contains information relating to the overall configuration of the transmission network 25. For example, this module preferably contains a mapping of all of the transmission lines, switches, transformers, etc. contained within the transmission network 25, as well as their open/closed status.

Module 315 relates to the market model of the transmission network 25. For example, this module can contain an engineering description of the physical electrical system 10 including, for example, power generation capacity, the configuration of the transmission network 25, the configuration of the distribution network 30, and additional information that represents the overall operation of the physical electrical system 10. The market model can also contain economic and environmental representations of the physical electrical system 10.

The market model can describe basic characteristics of the physical electrical system 10. For example, the market model can describe i) the ability for individual generators to ramp up or ramp down, ii) the total power generation capacity of a generator, iii) the total power generation capacity of all of the generation plants in the physical electrical system 10, iv) how much it costs to generate electricity at a given generator, v) the configuration of the transmission lines used to provide electricity from one node to another (e.g., this can include a mapping of all of the transmission lines in the physical electrical system 10), vi) the availability of transformers, vii) the actual or predicted demand at a point in the electrical system, viii) how much loss a transmission line causes, ix) pricing information (e.g., price points at both ends of a transmission line), and x) the environmental cost associated with each part of the physical electrical system 10. Preferably, the market model organizes all of this information in a way that is understandable to the OPF module 320.

Module 320 relates to the OPF algorithm. The module 320 uses the information provided by the module 315 to solve the linear programming optimization algorithm to improve the operation of the transmission network 25. That is, the OPF module uses the information provided by the module 315 in an attempt to calculate a new configuration of the transmission network 25 that will optimize operation of the transmission network 25 (e.g., by lowering cost, by reducing congestion, by reducing the environmental impact, etc.). The module 320 is also configured to generate the sensitivity parameters described above.

Module 325 relates to sensitivity parameters. In this module, a subset of sensitivity parameters are selected and are sent to the next module. The subset of sensitivity parameters is determined by the sensitivity parameters specified and needed in module 305 to obtain a new transmission topology.

Module 330 relates to the tracking of stop criterion. This module checks if the process should continue or if the OPF module has exhausted its options. For example, module 330 can be configured to determine if a better OPF solution is possible, if a maximum number of iterations has been performed, and if there is additional time allowed to continue the process. If the predetermined stop criterion are not met, then a new set of sensitivity parameters can be sent to module 305 so that new policy can be formed resulting in the new topology modification.

Figure 4:
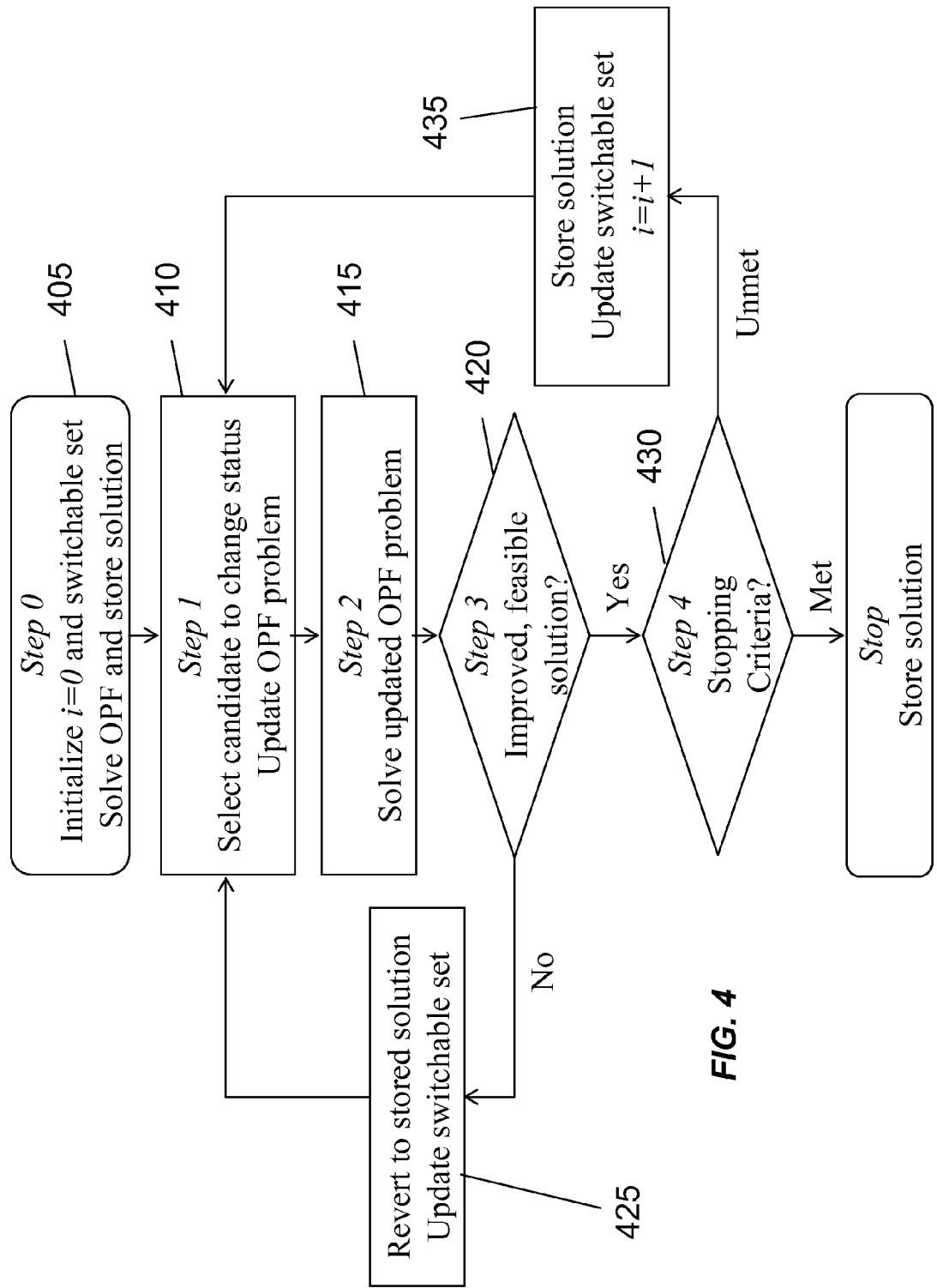
FIG. 4 is a process flow diagram used in connection with controlling the transmission of electricity.

In operation, referring to FIG. 4, with further reference to FIGS. 2-3 and 5, a process 400 for performing topology control using the system 205 includes the stages shown. The process 400, however, is exemplary only and not limiting. The process 400 may be altered, e.g., by having stages added, changed, removed, or rearranged. This process often has two objectives: improve cost performance and satisfy reliability requirements.

At stage 405, the transmission topology control 210 initializes the process 400 by solving the OPF with an initial topology and stores the solution including optimal primal and dual variable values. For example, the initial topology can be the current topology of the physical electrical system 10 when the process 400 begins. The optimal primal and dual variables are preferably the output of the OPF, solved using a linear programming algorithm. The transmission topology control 210 also preferably uses an iteration counter to count the number of iterations through the process 400. At stage 405 in some embodiments, the iteration counter is set to zero.

At stage 405, the transmission topology control 210 also determines the set of switches within the physical electrical system 10 whose state can be changed (e.g., opened or closed). In other words, the transmission topology control 210 initializes the switchable set. The transmission topology control 210 uses switchable set update criteria to determine which switches are allowed to change their states in the current iteration. For example, the initial switchable set can include all switches that are able to change state (e.g., there's no preexisting restriction on the ability of the switch to change states).

The switchable set is initially all lines, and it is preferably reduced in each iteration by removing the line(s) indicated by the switching criteria, regardless of whether removing the line leads to cost savings, and by also removing lines that do not meet the reliability requirements. Once a line is removed from the switchable set, in some embodiments it is not reinstated for the remaining iterations of the process 400. Finally, the switchable set preferably does not include lines that have negative upper transmission limits, or positive lower transmission limits.

Referring to FIG. 5, and as another example, of all the switches 505 shown in FIG. 5, may initially be selected as the switchable set. After each iteration of the process, the switchable set may shrink resulting in a smaller switchable set that includes only switches 520 through 525 to include in the switchable set, which can then be processed through even further iterations. Additionally, instead of selecting individual switches, the transmission topology control 210 can select individual transmission lines, which can then be used to determine corresponding switches.

At stage 410, the transmission topology control 210 uses the optimal primal and dual variable values from the OPF solution calculated in stage 405 to select the individual candidate switch(es) from within the switchable set for a change of state. The procedure for selecting the candidate is characterized by the switching criteria.

The switching criteria can select one or more switches (e.g., switches 505) as candidates to change status, and open or close these switches. In some embodiments, in each iteration of the process 400, the corresponding metric is computed and one or more lines are selected as a candidate for opening. The selection can be made by applying the same criteria in every iteration, by applying criteria that are a function of the iteration number, and by applying criteria that are a function of the results of previous iterations. The switching criteria itself can take a number of forms, including the simple use of OPF primal and dual solution variables for the selection, or be based on the result of optimization problems.

In some embodiments, at least five sensitivity-based criteria can be used individually or in combination to determine which lines to open or close: line profits criterion, price difference criterion, complete price difference switching criterion, total cost derivative criterion and PTDF-weighted criterion. With respect to the equations identified below, the following notation is used:

$f_k$ is the flow on line k $\pi_{from\ k}$, $\pi_{to\ k}$ are the nodal prices at the "from" and "to" nodes of line k $\theta_{from\ k}$, $\theta_{to\ k}$ are the nodal voltage angles at the "from" and "to" nodes of line k $\mu_k^{max}$, $\mu_k^{min}$ are the shadow prices of line k max and min flow constraints $\phi_k$ is the sensitivity of line k flow with respect to a transfer between the terminal nodes of line k (power transfer distribution factor)

The line profits switching criterion selects the most unprofitable line in the switchable set as a candidate line for opening, if there is any such line. Preferably, the line profit is defined as the product between the line flow and the difference in prices between the line's terminal nodes. Unprofitable lines have flow from a higher price node to a lower price node. In addition to the most unprofitable line, the second, third, fourth, etc. most unprofitable line can also be selected. An exemplary formula used in connection with this criterion is:

$$f_k(\pi_{to\ k}-\pi_{from\ k}) \qquad (1)$$

Other profitability criterion can also be considered such as royalty rates, tax rates, environmental costs, operating costs, line loss, etc.

The price difference switching criterion selects the transmission line in the switchable set with the largest price difference between its end nodes as the candidate for opening or closing. An exemplary formula used in connection with this criterion is:

$$\text{sign}(f_k)(\pi_{to\ k}-\pi_{from\ k}) \qquad (2)$$

The complete price difference switching criterion compares the absolute value of the price difference of two lines, and selects the line with the higher value of such metric as the candidate for a change in state. One of the two lines in some embodiments is the line selected by the price difference switching criterion. The other line is the line that has the largest price difference among the set of all open lines whose closure would lead to a profitable line (e.g., flow from lower price node to a higher price node). An exemplary formula used in connection with this criterion is:

$$\text{sign}(\theta_{from\ k}-\theta_{to\ k})(\pi_{to\ k}-\pi_{from\ k}) \quad (3)$$

The total cost derivative criterion selects the line from the switchable set with the most negative total cost derivative impacts (accounting for the initial line flow direction), if any, as the candidate for opening. The total cost derivative is given by the difference between the shadow price on the line capacity and the difference in prices between the line's terminal nodes, divided by the portion of flow that does not flow on the line if a 1 MW transfer is made from one terminal node of the line to the other one. An exemplary formula used in connection with this criterion is:

$$\text{sign}(f_k)\frac{(\mu_k^{max}-\mu_k^{min})-(\pi_{to\ k}-\pi_{from\ k})}{1-\varphi_k} \quad (4)$$

The PTDF-weighted criterion selects the line with the most negative power transfer distribution factor (PTDF) weighted total cost derivative impacts (accounting for the initial line flow direction). The PTDF-weighted total cost derivative is given by the difference between the shadow price on the line capacity and the difference in prices between the line's terminal nodes. An exemplary formula used in connection with this criterion is:

$$\text{sign}(f_k)((\mu_k^{max}-\mu_k^{min})-(\pi_{to\ k}-\pi_{from\ k})) \quad (5)$$

During stage 415, the transmission topology control 210 solves the OPF with the updated on/off state of the candidate switch(es) from stage 410. During this stage, the transmission topology control 210 generates new sensitivity parameters based upon the newly-solved OPF.

During stage 420, the transmission topology control 210 determines whether the OPF solution generated in stage 415 i) is feasible, and ii) is an improvement over the existing OPF solution (i.e., the OPF solution without the change in state). If the answer is no to either of these items, then the process continues to stage 425. Otherwise, the process continues to stage 430.

Because the metrics employed are based on gradients on the continuous flow space, but the amount of flow that can be changed is fixed for every line (e.g., reducing flow on the line to zero by opening it) it is possible that opening a line selected by the selection criteria may lead to increased costs or an infeasible and/or impossible transmission network topology. In these cases, the process 400 reverts the transmission network topology to a stored solution and removes the candidate line from the switchable set.

During stage 425, the transmission topology control 210 reverts the state of the candidate switch(es) back to the original state, the OPF solution is reverted to its previous values, and the switchable set and the iteration counter are updated. After stage 425, the process 400 continues back to stage 410.

During stage 430, the transmission topology control 210 determines whether stopping criteria are met. If so, the process 400 is terminated. Otherwise, the iteration counter is increased, the switch(es) states and OPF solutions are stored, and the process returns to stage 410.

The stopping criterion may determine the number of iterations applied, and can include a number of conditions. For example, the process 400 may stop if no lines meet the switching criteria, or if the switchable set is empty. Additionally, the process 400 can have a pre-set maximum number of iterations, and/or maximum number of status changes. Further, the process 400 may stop if cost reductions exceed a certain threshold, or if the computation time is above a pre-defined limit.

While "cost" has been referred to herein, this term is not limited to monetary values. For example, cost in the context of an electrical distribution system can represent many different aspects of operation. For example, cost associated with an electrical system can relate to monetary concerns, value, environmental concerns, political concerns, reliability concerns, and security concerns.

Other embodiments are within the scope and spirit of the invention.

The subject matter and functionality described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in a non-transitory, tangible information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, (e.g., EPROM, EEPROM, and flash memory devices); magnetic disks, (e.g., internal hard disks or removable disks); magneto-optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back-end component (e.g., a data server), a middleware component (e.g., an application server), or a front-end component (e.g., a client computer having a graphical user interface or a web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

Further, while the description above refers to the invention, the description may include more than one invention.

What is claimed is:

1. A computerized method implemented on one or more processors for transmission network control, the transmission network including transmission lines and corresponding switches, the transmission network being configured for use in providing electricity from a generator to an end user, the method comprising:
   receiving and storing at the one or more processors a sensitivity parameter;
   identifying, using the one or more processors, a switchable set of switches within the transmission network using the sensitivity parameter;
   determining, using the one or more processors, a candidate switch from the switchable set to change a corresponding state, wherein the state can be changed from open to closed and closed to open;
   determining, using the one or more processors, a proposed change of state of the candidate switch;
   updating, using the one or more processors, an optimal power flow (OPF) problem stored in a memory as a function of the candidate switch and the proposed change of state;
   determining, using the one or more processors, and storing in a memory a solution to the updated OPF problem;
   generating, using the one or more processors, an updated sensitivity parameter based on the stored solution to the updated OPF problem; and
   determining, using the updated sensitivity parameter, if the stored solution to the updated OPF problem meets a predetermined criterion.

2. The method of claim 1 wherein determining if the solution to the updated OPF problem meets the predetermined criterion includes determining, using the one or more processors, if the solution to the updated OPF problem is feasible.

3. The method of claim 2 further comprising reverting to a prior OPF solution if the solution to the updated OPF problem is not feasible.

4. The method of claim 1 wherein determining if the solution to the updated OPF problem meets the predetermined criterion includes determining, using the one or more processors, if the solution to the updated OPF problem results in a performance improvement of the transmission network from a prior OPF solution.

5. The method of claim 4 wherein determining if the solution to the updated OPF problem results in a performance improvement includes determining if an operating cost of the transmission network changes.

6. The method of claim 1, further comprising iteratively performing each of the steps until a stopping criterion is satisfied.

7. The method of claim 1 wherein the sensitivity parameter includes one of a physical sensitivity parameter, economic sensitivity parameter, and an environmental sensitivity parameter.

8. The method of claim 1 wherein generating the updated sensitivity parameter includes generating the updated sensitivity parameter based on at least one of a locational price and a shadow price of a transmission constraint.

9. The method of claim 1:
   wherein the predetermined criterion is a function of whether the solution to the updated OPF problem i) is feasible, and ii) will result in a performance improvement of the transmission network; and
   the method further comprises implementing the solution to the updated OPF problem if the predetermined criterion is satisfied.

10. The method of claim 1 wherein identifying a switchable set of switches includes identifying which transmission line within the transmission network is the least profitable.

11. The method of claim 1 wherein identifying a switchable set of switches includes:
   determining, using the one or more processors, price differences between end nodes of a plurality of transmission lines in the transmission network; and
   identifying, sing the one or more processors, which of the price differences is largest.

12. The method of claim 1 wherein identifying a switchable set of switches includes:
   determining, using the one or more processors, absolute values of price differences between end nodes of a plurality of transmission lines in the transmission network; and
   identifying, sing the one or more processors, which of the absolute values is largest.

13. The method of claim 1 wherein identifying a switchable set of switches includes:
   determining, using the one or more processors, cost derivatives associated with a plurality of transmission lines in the transmission network; and
   identifying, the one or more processors, the cost derivative having the most negative cost impact.

14. The method of claim 1 wherein identifying a switchable set of switches includes:
- determining, using the one or more processors, power transfer distribution factors associated with a plurality of transmission lines in the transmission network; and
- identifying, using the one or more processors, the power transfer distribution factor having the most negative value.

15. A tangible computer readable medium including instructions that, when executed by the a computer, cause the computer to:
- receive a sensitivity parameter;
- identify a switchable set of switches associated with transmission lines in a transmission network using the sensitivity parameter;
- determine a candidate switch from the switchable set to change a corresponding state, wherein the state can be changed from open to closed and closed to open;
- determine a proposed change of state of the candidate switch;
- update an optimal power flow (OPF) problem as a function of the candidate switch and the proposed change of state;
- determine a solution to the updated OPF problem;
- generate an updated sensitivity parameter based on the solution to the updated OPF problem; and
- determine, using the updated sensitivity parameter, if the solution to the updated OPF problem meets a predetermined criterion.

16. The tangible computer readable medium of claim 15, the instructions being further configured to cause the computer to identify which transmission line within the transmission network is the least profitable.

17. The tangible computer readable medium of claim 15, the instructions being further configured to cause the computer to:
- determine price differences between end nodes of a plurality of transmission lines in the transmission network; and
- identify which of the prices differences is largest.

18. The tangible computer readable medium of claim 15, the instructions being further configured to cause the computer to:
- determine absolute values of price differences between end nodes of a plurality of transmission lines in the transmission network; and
- identify which of the absolute values is largest.

19. The tangible computer readable medium of claim 15, the instructions being further configured to cause the computer to:
- determine cost derivatives associated with a plurality of transmission lines in the transmission network; and
- identify the cost derivative having the most negative cost impact.

20. The tangible computer readable medium of claim 15, the instructions being further configured to cause the computer to:
- determine power transfer distribution factors associated with a plurality of transmission lines in the transmission network; and
- identify the power transfer distribution factor having the most negative value.

* * * * *